(12) United States Patent
Zhao et al.

(10) Patent No.: US 9,134,135 B2
(45) Date of Patent: Sep. 15, 2015

(54) NAVIGATION SYSTEM WITH MODE BASED MECHANISM AND METHOD OF OPERATION THEREOF

(71) Applicant: Telenav, Inc., Sunnyvale, CA (US)

(72) Inventors: George Xiaohong Zhao, Mountain View, CA (US); Ryan Robert Peterson, Seattle, WA (US)

(73) Assignee: TELENAV, INC., Sunnyvale, CA (US)

( * ) Notice: Subject to any disclaimer, the term of this patent is extended or adjusted under 35 U.S.C. 154(b) by 13 days.

(21) Appl. No.: 14/045,171

(22) Filed: Oct. 3, 2013

(65) Prior Publication Data

US 2015/0100237 A1    Apr. 9, 2015

(51) Int. Cl.
| | | |
|---|---|---|
| G08G 1/123 | (2006.01) | |
| G01C 21/34 | (2006.01) | |
| G01C 21/26 | (2006.01) | |
| G01C 21/36 | (2006.01) | |

(52) U.S. Cl.
CPC .............. *G01C 21/34* (2013.01); *G01C 21/26* (2013.01); *G01C 21/3629* (2013.01)

(58) Field of Classification Search
None
See application file for complete search history.

(56) References Cited

U.S. PATENT DOCUMENTS

| | | | |
|---|---|---|---|
| 6,009,403 A * | 12/1999 | Sato ................................... 705/6 | |
| 6,968,508 B2 | 11/2005 | Lucaci et al. | |
| 7,054,745 B1 * | 5/2006 | Couckuyt et al. ............. 701/431 |
| 7,474,960 B1 * | 1/2009 | Nesbitt ........................... 701/533 |
| 7,512,487 B1 * | 3/2009 | Golding et al. ................ 701/424 |
| 7,715,980 B2 * | 5/2010 | Bargeron et al. .............. 701/425 |
| 7,865,304 B2 | 1/2011 | Gretton et al. | |
| 8,290,702 B2 | 10/2012 | Yeh | |
| 8,325,180 B2 | 12/2012 | Kim | |
| 8,954,860 B1 * | 2/2015 | Hands et al. ................... 715/738 |
| 2003/0060976 A1 * | 3/2003 | Sato et al. ..................... 701/209 |
| 2004/0054467 A1 * | 3/2004 | Sakai et al. .................... 701/209 |
| 2004/0102898 A1 * | 5/2004 | Yokota et al. ................. 701/210 |
| 2005/0096840 A1 * | 5/2005 | Simske ......................... 701/202 |
| 2006/0069500 A1 * | 3/2006 | Hashizume ................... 701/209 |
| 2006/0069503 A1 * | 3/2006 | Suomela et al. .............. 701/211 |
| 2006/0089797 A1 * | 4/2006 | Suzuki et al. ................. 701/211 |
| 2007/0138347 A1 * | 6/2007 | Ehlers ........................... 246/1 R |
| 2007/0198184 A1 * | 8/2007 | Yoshioka et al. ............. 701/211 |
| 2008/0082258 A1 * | 4/2008 | Pham et al. ................... 701/206 |
| 2008/0167801 A1 * | 7/2008 | Geelen et al. ................. 701/201 |
| 2009/0177987 A1 * | 7/2009 | Jayakody ...................... 715/764 |
| 2009/0210388 A1 * | 8/2009 | Elson et al. ....................... 707/3 |
| 2010/0324816 A1 * | 12/2010 | Highstrom et al. ........... 701/209 |
| 2012/0166531 A1 * | 6/2012 | Sylvain ......................... 709/204 |
| 2012/0250517 A1 | 10/2012 | Saarimaki et al. | |
| 2014/0280060 A1 * | 9/2014 | Campbell et al. ............. 707/722 |

* cited by examiner

*Primary Examiner* — Calvin Cheung

(74) *Attorney, Agent, or Firm* — IP Investment Law Group

(57) ABSTRACT

A method of operation of a navigation system includes: identifying an activity area with a control unit based on a user's travel meeting or exceeding a travel threshold; determining a guidance mode based on a current location within the activity area and the current location for locating a device; and setting a guidance level based on the guidance mode for presenting a navigation guidance on the device.

18 Claims, 6 Drawing Sheets

NAVIGATION SYSTEM WITH MODE BASED MECHANISM AND METHOD OF OPERATION THEREOF

TECHNICAL FIELD

The present invention relates generally to a navigation system, and more particularly to a system with mode based mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without mode based mechanism has become a paramount concern for the consumer. The navigation system without mode based mechanism decreases the benefit of using the tool.

Thus, a need still remains for a navigation system with mode based mechanism. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: identifying an activity area with a control unit based on a user's travel meeting or exceeding a travel threshold; determining a guidance mode based on a current location within the activity area and the current location for locating a device; and setting a guidance level based on the guidance mode for presenting a navigation guidance on a device.

The present invention provides a navigation system, including: a territory module for identifying an activity area based on a user's travel meeting or exceeding a travel threshold; a mode module, coupled to the territory module, for determining a guidance mode based on a current location within the activity area and the current location for locating a device; and a guidance module, coupled to the mode module, for setting a guidance level based on the guidance mode for presenting a navigation guidance on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
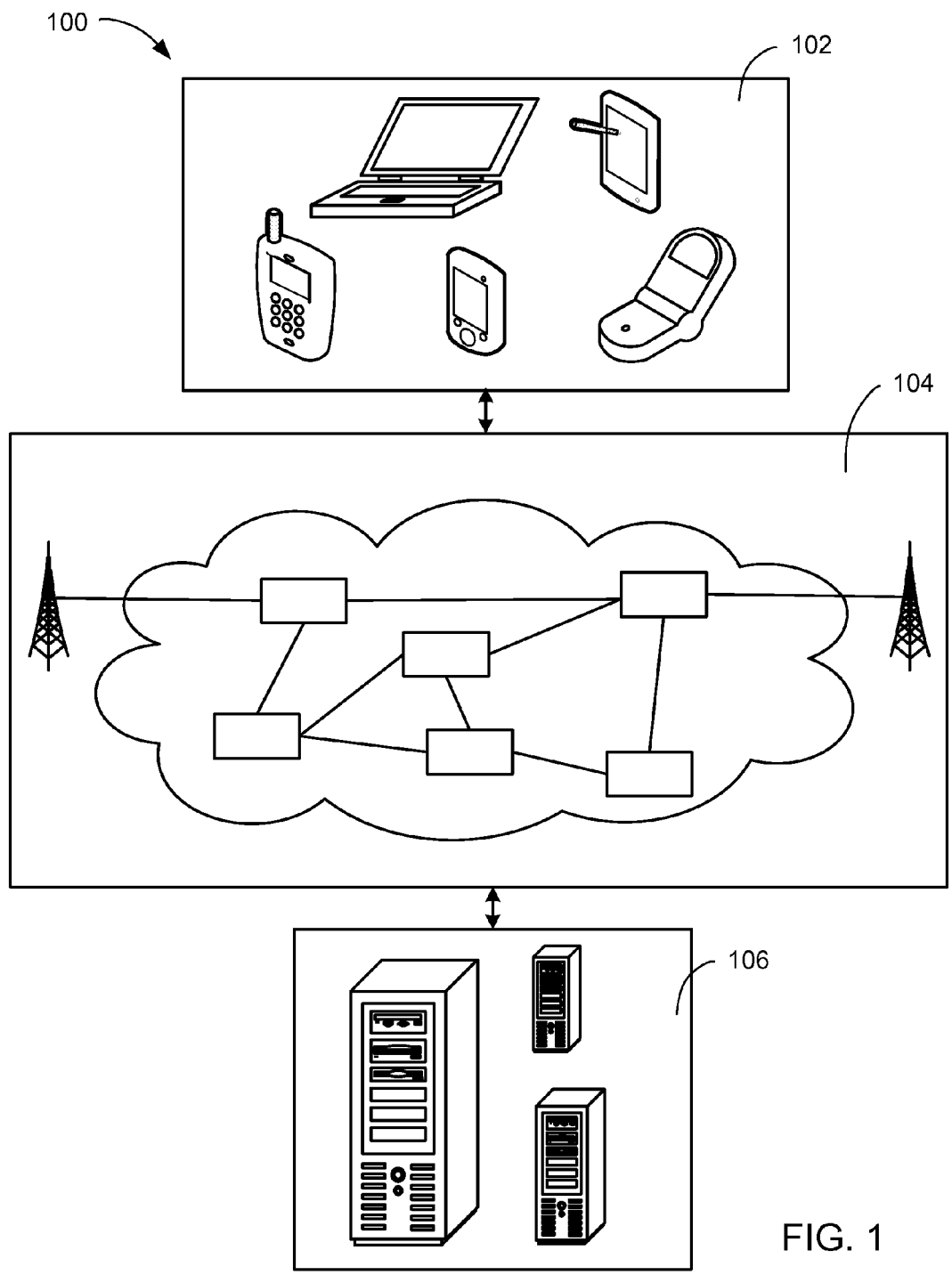
FIG. 1 is a navigation system with mode based mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with mode based mechanism in an embodiment of the present invention. The navigation system 100 includes a first device 102, such as a client or server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as a notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
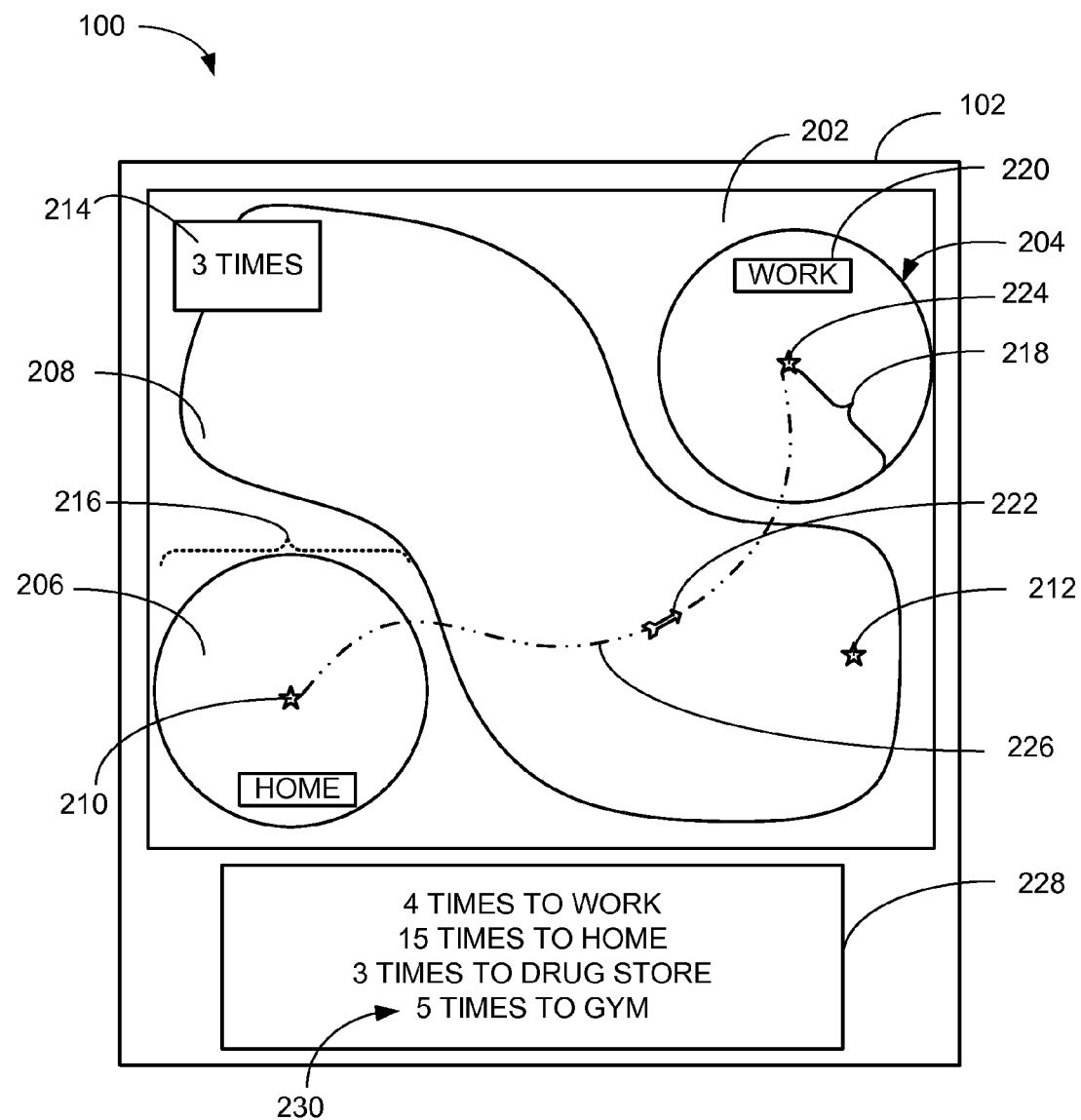
FIG. 2 is an example of a geographic region having an activity area.

Referring now to FIG. 2, there is shown an example of a geographic region 202 having an activity area 204. For clarity and brevity, the discussion of the embodiment of the present invention will be described with the first device 102 delivering the result generated by the navigation system 100. However, the second device 106 of FIG. 1 and the first device 102 can be discussed interchangeably.

The activity area 204 can represent the geographic region 202 traveled by the user of the navigation system 100 displayed on the first device 102. The activity area 204 can include a familiar area 206, an unfamiliar area 208, or a combination thereof. The familiar area 206 is defined as the geographic region 202 surrounding a familiar location 210. The unfamiliar area 208 is defined as the geographic region 202 surrounding an unfamiliar location 212. The shape of the activity area 204 can represent a circle, a rectangle, or a combination thereof. For another example, the shape of the neighborhood, city, state, nation, or a combination thereof can form the shape of the activity area 204.

The familiar location 210 is defined as a physical location where a number of a user's travel 230 to a physical location, the geographic region 202, or a combination thereof meets or exceeds a travel threshold 214. The unfamiliar location 212 defined as a physical location where the number of the user's travel 230 to that physical location is below the travel threshold 214. The user's travel 230 can represent a visitation or a traversal by the user of the navigation system 100 in the geographic region 202.

The travel threshold 214 is defined as a minimum number of the user's travel 230. For example, the travel threshold 214 can represent the minimum number of the user's travel 230 within a time period. For a specific example, the travel threshold 214 can be set as twice a week. If the user of the navigation system 100 visits a location for three times in one week, the location can represent the familiar location 210 because the user's number of visitation exceeded the travel threshold 214. If the user visits only once a week, the location can represent the unfamiliar location 212 because the user's number of visitation is below the travel threshold 214. For another example, the travel threshold 214 can represent a minimum frequency of the user's travel 230 in the geographic region 202. For example, the travel threshold 214 can represent visiting the geographic region 202 twice.

An area size 216 is defined as a range of two-dimensional space of the activity area 204. For example, the familiar area 206 can have the area size 216 of ten square kilometers. A threshold distance 218 is defined as maximum distance from a physical location to a boundary of the activity area 204. For example, the threshold distance 218 from the familiar location 210 to the boundary of the familiar area 206 surrounding the familiar location 210 can represent 5 kilometers (km).

A location type 220 is defined as a categorization of the geographic location. For example, the location type 220 can include the familiar location 210, the unfamiliar location 212, or a combination thereof. More specifically, the location type 220 can represent user's workplace, user's home, or a combination thereof. A current location 222 is defined as the present location information of the first device 102. For example, the current location 222 can represent the present latitudinal and longitudinal information of the first device 102. A destination 224 is defined as a waypoint of the user's travel 230. For example, the destination 224 can represent the endpoint of the user's travel 230. A travel route 226 is defined as a path for reaching the destination 224.

An activity record 228 is defined as a log of the user's travel 230. For example, the activity record 228 can indicate that the user had visited a location of the location type 220, such as the user's workplace four time out of the week.

Figure 3:
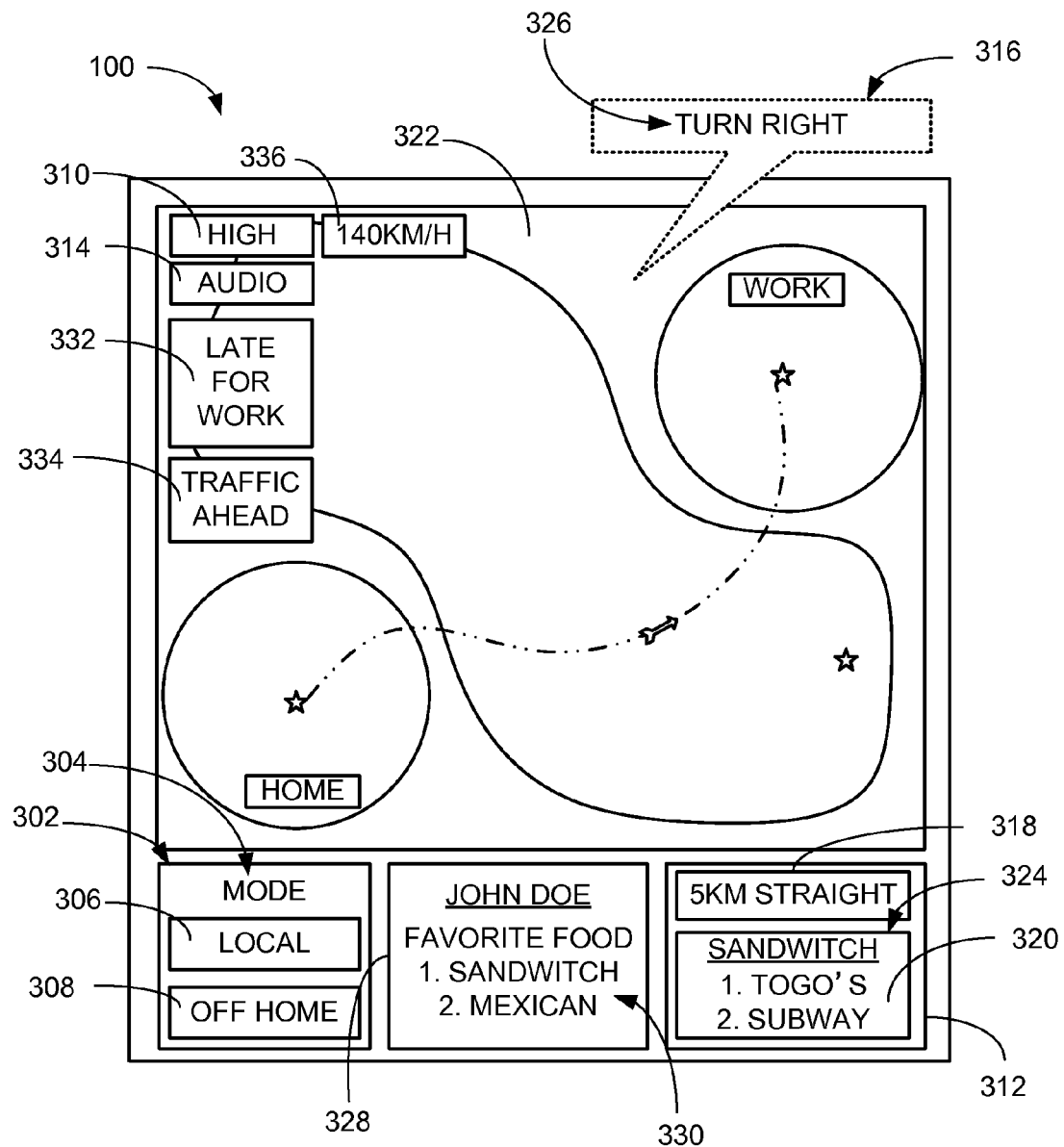
FIG. 3 is an example of a mode type.

Referring now to FIG. 3, there is shown an example of a mode type 302. The mode type 302 is a categorization of a guidance mode 304. The guidance mode 304 is defined as a state of the navigation system 100 tailored for the activity area 204 of FIG. 2. For example, the guidance mode 304 can include a familiar mode 306, an unfamiliar mode 308, or a combination thereof.

The familiar mode 306 can represent the guidance mode 304 when the current location 222 of FIG. 2 is within the familiar area 206 of FIG. 2. The unfamiliar mode 308 can represent when the current location 222 is outside of the familiar area 206, within the unfamiliar area 208 of FIG. 2, or a combination thereof. A guidance level 310 is defined as the amount of details of a navigation guidance 312 presented by the navigation system 100. For example, the guidance level 310 of the navigation guidance 312 presented on the first device 102 when the navigation system 100 is in the unfamiliar mode 308 can be greater than when the navigation system 100 is in the familiar mode 306.

The navigation guidance 312 is defined as information generated by the navigation system 100 to aid the travel. A guidance type 314 is defined as a categorization of the navigation guidance 312. For example, the guidance type 314 can include an audio guidance 316, a route guidance 318, a search result 320, a travel map 322, or a combination thereof.

The audio guidance 316 can represent the audio version of the navigation guidance 312. The route guidance 318 can represent the visual version of the navigation guidance 312. The search result 320 can represent a list, a ranking, or a combination thereof of a category of interest 324 generated by the navigation system 100 in response to a query performed by the user on the first device 102. The travel map 322 can represent a two-dimensional, a three-dimensional, or a combination thereof digital drawing of the geographic region 202 of FIG. 2. The category of interest 324 is defined as a classification of a point of interest. For example, the category of interest 324 can represent cuisine type, entertainment type, brand type, or a combination thereof.

A content type 326 is defined as a classification of the content presented for the navigation guidance 312. For example, the content type 326 can include traffic information, weather information, police activity information, or a combination thereof.

A user profile 328 can represent personal information regarding the user of the navigation system 100. The user profile 328 can include a user preference 330, which can represent a predilection of the user of the navigation system 100.

A context 332 is defined as a set of facts or circumstances that surround the first device 102. For example, the context 332 can include an environmental condition 334. The environmental condition 334 can include the location type 220 where the current location 222 is near, an urgency level 336, a type of the activity area 204 where the current location 222 can be determined, or a combination thereof. The urgency level 336 is defined as a magnitude of time constraint. For example, the urgency level 336 of the user of the navigation system 100 in the morning can be "high" because the user can be late to work.

Figure 4:
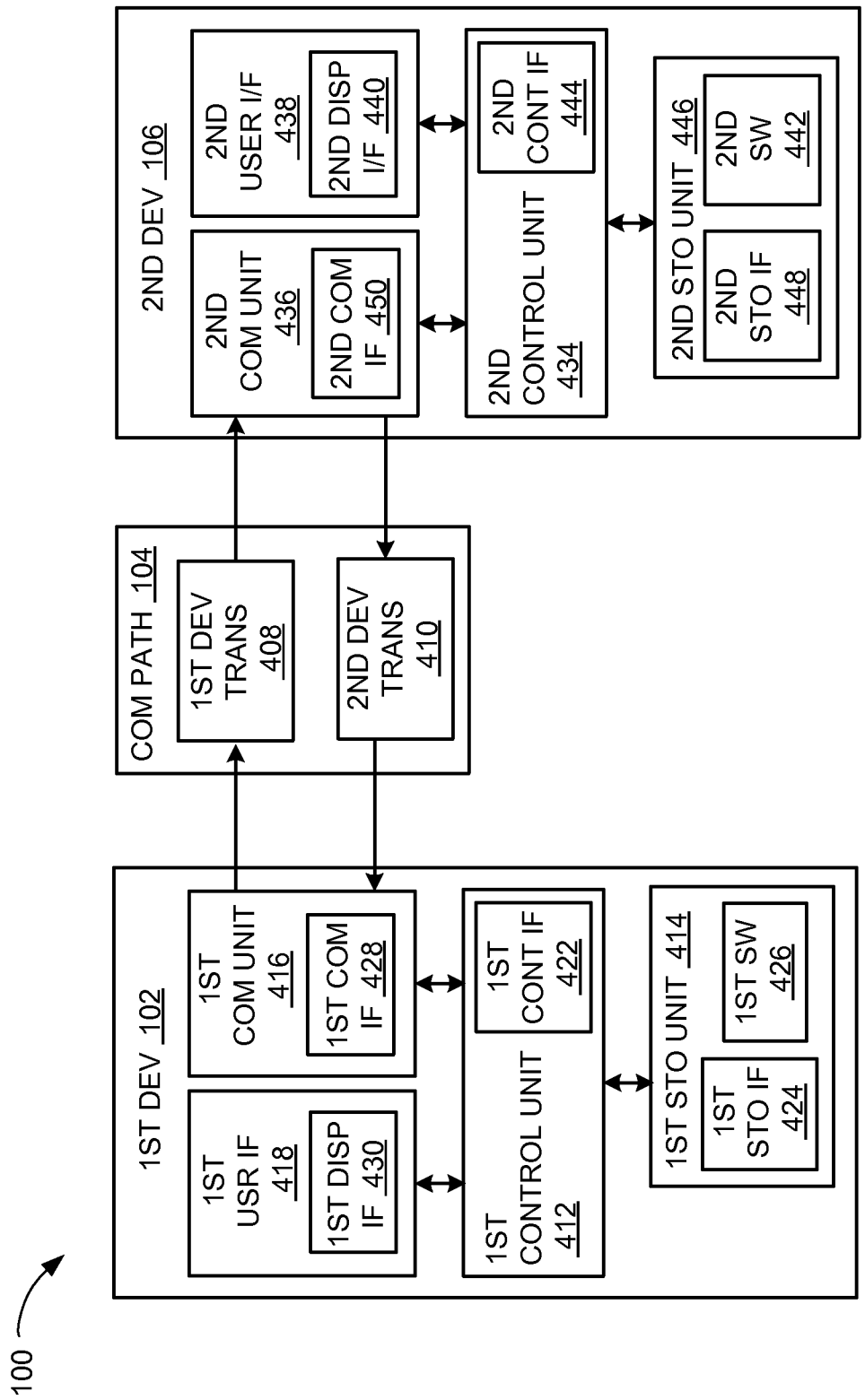
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destination 206s. The external sources and the external destination 206s refer to sources and destination 206s physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destination 206s. The external sources and the external destination 206s refer to sources and destination 206s physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as nonvolatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destination 206s. The external sources and the external destination 206s refer to sources and destination 206s physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destination 206s. The external sources and the external destination 206s refer to sources and destination 206s physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as nonvolatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destination 206s. The external sources and the external destination 206s refer to sources and destination 206s physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
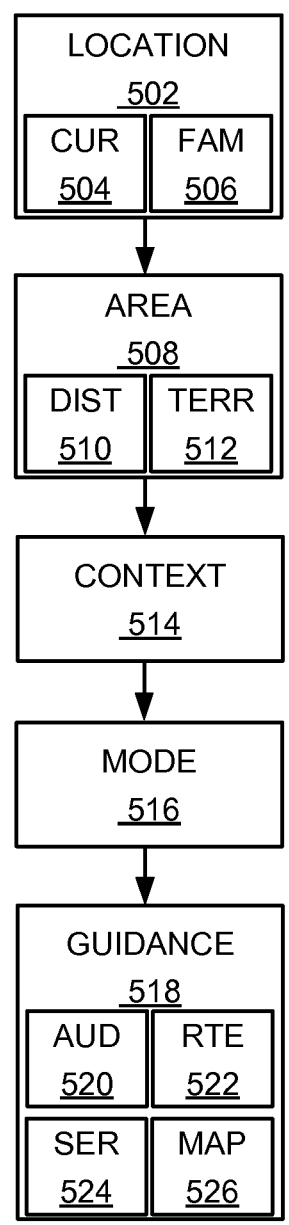
FIG. 5 is a control flow of the navigation system.

Referring now to FIG. 5, therein is shown a control flow of the navigation system 100. The navigation system 100 can include a location module 502. The location module 502 determines the current location 222 of FIG. 2 of the first device 102 of FIG. 1. The location module 502 can include a current module 504. The current module 504 determines the current location 222. For example, the current module 504 can determine the current location 222 via the location unit 420 of FIG. 4.

The location module 502 can include a familiarity module 506. The familiarity module 506 determines the location type 220 of FIG. 2. For example, the familiarity module 506 can determine the location type 220 of the familiar location 210 of FIG. 2, the unfamiliar location 212 of FIG. 2, or a combination thereof. For example, the familiarity module 506 can determine the familiar location 210, the unfamiliar location 212, or a combination thereof based on the activity record 228 of FIG. 2. More specifically, the familiarity module 506 can determine the familiar location 210 based on the activity record 228 disclosing that the number of the user's travel 230 of FIG. 2 meeting or exceeding the travel threshold 214 of FIG. 2. In contrast, the familiarity module 506 can determine the familiar location 210 based on the activity record 228 disclosing the number of the user's travel 230 is below the travel threshold 214. The location module 502 can send the current location 222, the familiar location 210, the unfamiliar location 212, or a combination thereof to an area module 508.

The navigation system 100 can include the area module 508, which can couple to the location module 502. The area module 508 identifies the activity area 204 of FIG. 2. For example, the area module 508 can identify the activity area 204 representing the familiar area 206 of FIG. 2, the unfamiliar area 208 of FIG. 2, or a combination thereof.

The area module 508 can identify the activity area 204 in a number of ways. The area module 508 can include a distance module 510. The distance module 510 generates the threshold distance 218 of FIG. 2. The distance module 510 can generate the threshold distance 218 in a number of ways.

For example, the distance module 510 can generate the threshold distance 218 based on different instances of the location type 220 amongst the instances of the familiar location 210, the unfamiliar location 212, or a combination thereof. One instance of the familiar location 210 can represent home and the other instance of the familiar location 210 can represent workplace. The distance module 510 can generate the threshold distance 218 for the location type 220 of workplace greater than the threshold distance 218 for the location type 220 of home.

For another example, the distance module 510 can generate the threshold distance 218 based on the user profile 328 of FIG. 3. For example, if the user profile 328 indicates that the user of the navigation system 100 is a teenager, the distance module 510 can generate the threshold distance 218 that greater than the threshold distance 218 for the user of the navigation system 100 who is an adult. The user preference 330 of FIG. 3 can indicate the extent of the threshold distance 218. For example, the threshold distance 218 for the teenager can be twice as greater than the threshold distance 218 of the adult.

For a different example, the distance module 510 can generate the threshold distance 218 based on the activity record 228 of the user's travel 230. More specifically, the distance module 510 can generate the threshold distance 218 based on the highest number of the user's travel 230 exceeding the travel threshold 214. The travel threshold 214 can represent ten times in a month. The activity record 228 can indicate that the user's travel 230 that is 5 km from the familiar location 210 has the distance with the highest frequency that exceeds the travel threshold 214. The distance module 510 can generate the threshold distance 218 that is 5 km.

The area module 508 can include a territory module 512. The territory module 512 identify the familiar area 206, the unfamiliar area 208, or a combination thereof. For example, the territory module 512 can identify the familiar area 206, the unfamiliar area 208, or a combination thereof based on the activity record 228 within the geographic region 202 of FIG. 2. More specifically, the territory module 512 can identify the familiar area 206, the unfamiliar area 208, or a combination thereof based on the user's travel 230 meeting or exceeding the travel threshold 214.

If the activity record 228 indicates that the user of the navigation system 100, or the first device 102 as a specific example, frequently visits or travels through the geographic region 202, the territory module 512 can identify the activity area 204 representing the familiar area 206. In contrast, if the activity record 228 indicates that the user of the navigation system 100 never had visited or seldom visits the geographic region 202, the territory module 512 can identify the activity area 204 representing the unfamiliar area 208. The user of the navigation system 100 can seldom visit the geographic region 202 if the user had visited the geographic region 202 once or twice in the past five years.

For another example, the territory module 512 can identify the activity area 204 based on the user preference 330, the threshold distance 218, or a combination thereof. For example, the user preference 330 can define the threshold distance 218 for the activity area 204 representing the familiar area 206. More specifically, the territory module 512 can identify the familiar area 206 based on the threshold distance 218 of 1 km from the familiar location 210. Moreover, the territory module 512 can identify the activity area 204 as the familiar area 206 based on the geographic region 202 surrounding the familiar location 210 that is within the threshold distance 218 of 1 km. For example, the territory module 512 can identify the familiar area 206 having the area size 216 of FIG. 2 that is 1 square kilometers. In contrast, the territory module 512 can identify the activity area 204 as the unfamiliar area 208 based on the geographic region 202 surrounding the familiar location 210 that is outside of the boundary of the familiar area 206 established based on the threshold distance 218.

For further example, the territory module 512 can generate one instance of the activity area 204 overlapping another instance of the activity area 204 based on the threshold distance 218. If the threshold distance 218 from the familiar location 210 is 5 km and the threshold distance 218 from the unfamiliar location 212 is 5 km and the distance between the familiar location 210 and unfamiliar location 212 is 6 km, the territory module 512 can identify the familiar area 206 overlapping the unfamiliar area 208.

The territory module 512 can identify the activity area 204 based on the user profile 328, the threshold distance 218, or a combination thereof. For example, the user profile 328 can indicate that the user of the navigation system 100 can represent a female. The threshold distance 218 generated for the user profile 328 can represent 5 km radius. In contrast, the threshold distance 218 generated for the user profile 328 for a male can represent the threshold distance 218 of 2 km radius. The territory module 512 can identify the activity area 204 that is greater for the user profile 328 representing a female than the user profile 328 representing a male. The area module 508 can send the activity area 204 to a context module 514.

The navigation system 100 can include the context module 514, which can couple to the area module 508. The context module 514 determines the context 332 of FIG. 3. For example, the context module 514 based on the environmental condition 334 of FIG. 3, the current location 222, the activity record 228, or a combination thereof.

The context module 514 can determine the context 332 in a number of ways. For example, the context module 514 can determine the context 332 based on factoring the environmental condition 334 surrounding the user's travel 230. The environmental condition 334 can represent whether the current location 222 is within the familiar area 206, the unfamiliar area 208, or a combination thereof. If the current location 222 is within the familiar area 206, the context module 514 can determine the context 332 that the user of the navigation system 100 is familiar to the geographic region 202. In contrast, if the current location 222 is within the unfamiliar area 208, the context module 514 can determine the context 332 that the user of the navigation system 100 is a foreigner to the geographic region 202.

For another example, the context module 514 can determine the context 332 based on the environmental condition 334 representing the urgency level 336 of FIG. 3. The urgency level 336 can base on the time of day, the destination 224 of FIG. 2 where the user of the navigation system 100 is heading to, or a combination thereof. For example, the urgency level 336 can represent "high" based on the user of the navigation system 100 heading to work in the morning. More specifically, the context module 514 can determine the urgency level 336 based on calculating the arrival time from the current location 222 to destination 224 and the user's travel speed. If the user can arrive before a designated time, the context module 512 can determine the urgency level 336 to be "low." In contrast, if the user cannot arrive before or on a designated time, the context module 512 can determine the urgency level 336 to be "high." The context module 514 can determine the context 332 to be "busy" based on the urgency level 336. In contrast, the urgency level 336 can represent "low" for Sunday afternoon with no travel plan to reach the destination 224. The context module 514 can determine the context 332 to be "leisurely" based on the urgency level 336. The context module 514 can send the context 332 to a mode module 516.

For illustrative purposes, the navigation system 100 is described with the area module 508 identifying the activity area 204 based on the activity record 228, although it is understood that the area module 508 can be operated differently. For example, the area module 508 can identify the activity area 204 based on the context 332.

For a specific example, the area module 508 can update the activity area 204 by changing the area size 216 by modifying the threshold distance 218 based on the context 332. More specifically, the context 332 can represent driving at night. The familiarity of the geographic region 202 can decrease because the inability for the user of the navigation system 100 to recognize the environmental condition 334. The area module 508 can update the area size 216 of the activity area 204 to increase the guidance level 310 of FIG. 3. Moreover, the area module 508 can update the area size 216 by decreasing the threshold distance 218 from the familiar location 210 to decrease the area size 216 of the familiar area 206 and to increase the area size 216 of the unfamiliar area 208. In the unfamiliar area 208, the guidance level 310 can be increased to provide more information to the user of the navigation system 100 for the unfamiliar area 208. In contrast, the area module 508 can update the area size 216 of the activity area 204 to decrease the guidance level 310 based on the context 332 of traveling during the daytime.

It has been discovered that the navigation system 100 can modify the area size 216 of the activity area 204 based on the context 332 to improve the safe operation of the navigation system 100. By increasing or decreasing the threshold distance 218 to modify the area size 216, the navigation system 100 can modify the guidance level 310 tailored for the context 332. As a result, the user can receive the navigation guidance 312 of FIG. 3 with the guidance level 310 customized for the context 332 for the safer operation of the vehicle, the navigation system 100, or a combination thereof.

The navigation system 100 can include the mode module 516, which can couple to the context module 514. The mode module 516 determines the guidance mode 304 of FIG. 3. For example, the mode module 516 can determine the guidance mode 304 based on the activity area 204.

The mode module 516 can determine the guidance mode 304 in a number of ways. For example, the mode module 516 can determine the guidance mode 304 representing the familiar mode 306 of FIG. 3 if the current location 222 is determined to be within the familiar area 206. The mode module 516 can determine the guidance mode 304 representing the unfamiliar mode 308 of FIG. 3 if the current location 222 is determined to be within the unfamiliar area 208.

For another example, the mode module 516 can prioritize the mode type 302 of FIG. 3 of the guidance mode 304 based on the context 332. More specifically, the context 332 can be the user of the navigation system 100 rushing to a meeting in a business trip. The current location 222 can be within the unfamiliar area 208. The mode module 516 can prioritize the mode type 302 by updating from the unfamiliar mode 308 to the familiar mode 306 to minimize the guidance level 310 even though the current location 222 is within the unfamiliar area 208.

It has been discovered that the navigation system 100 can prioritize the mode type 302 for selecting the guidance mode 304 suited for the context 332. By updating the mode type 302 based on the context 332, the navigation system 100 can provide the navigation guidance 312 with the guidance level 310 tailored for the context 332 within the given instance of the activity area 204. As a result, the user can improve the efficiency and safe operation of the vehicle, the navigation system 100, or a combination thereof.

For another example, the mode module 516 can determine the guidance mode 304 based on the user preference 330. The user preference 330 can set the guidance mode 304 as the familiar mode 306 even though the current location 222 can be within the unfamiliar area 208. The mode module 516 can send the guidance mode 304 to a guidance module 518.

The navigation system 100 can include the guidance module 518, which can couple to the mode module 516. The guidance module 518 generates the navigation guidance 312. For example, the guidance module 518 can generate the navigation guidance 312 based on the mode type 302.

The guidance module 518 can generate the navigation guidance 312 in a number of ways. For example, the guidance module 518 can generate the navigation guidance 312 based on the mode type 302 of the guidance mode 304, the guidance level 310, or a combination thereof. More specifically, if the guidance mode 304 is the mode type 302 of the familiar mode 306, the guidance module 518 can set the guidance level 310 to "low" to provide less verbose content for the navigation guidance 312. In contrast, if the guidance mode 304 is the mode type 302 of the unfamiliar mode 308, the guidance module 518 can set the guidance level 310 to "high" to provide more verbose content for the navigation guidance 312. More specifically, verbose content for the navigation guidance 312 can represent a turn-by-turn direction for each street encountered, traversed, or a combination thereof by the first device 102. Less verbose content of the navigation guidance 312 can represent turn-by-turn direction on an expressway or a freeway encountered, traversed, or a combination thereof by the first device 102 but not for local roads.

It has been discovered that the navigation system 100 can set the guidance level 310 of the navigation guidance 312 based on the mode type 302 of the guidance mode 304 for providing the navigation guidance 312 customized for the travel within the activity area 204. The ability for the navigation system 100 to change the mode type 302 to increase or decrease the guidance level 310 maximizes the efficiency for providing the navigation guidance 312 to the user of the navigation system 100. As a result, the user can receive the navigation guidance 312 optimal for the activity area 204 for the safer operation of the vehicle, the navigation system 100, or a combination thereof.

For another example, the guidance module 518 can generate the navigation guidance 312 based on the guidance type 314 of FIG. 3. The guidance module 518 can modify the guidance level 310 of the guidance type 314 based on the mode type 302, the activity area 204, the context 332, or a combination thereof. For further example, the guidance module 518 can change the guidance level 310 by tailoring the content type 326 of FIG. 3 of the navigation guidance 312 based on the context 332, the activity area 204, or a combination thereof. As discussed above, the context 332 can represent traffic congestion commuting to work. The guidance module 518 can increase the guidance level 310 for the content type 326 of traffic information and decrease the guidance level 310 for the content type 326 of weather information along the commute to provide more relevant information to the user under the context 332.

It has been discovered that the navigation system 100 can modify the guidance level 310 of the navigation guidance 312 based on the mode type 302 of the guidance mode 304 for providing the content type 326 optimal for the activity area 204. The ability for the navigation system 100 to change the mode type 302 to provide the content type 326 that is relevant maximizes the efficiency for providing the navigation guidance 312 to the user of the navigation system 100. As a result, the user can receive the content type 326 optimal for the activity area 204 for the safer operation of the vehicle, the navigation system 100, or a combination thereof.

The guidance module 518 can include an audio module 520. The audio module 520 generates the guidance type 314 of the navigation guidance 312 representing the audio guidance 316 of FIG. 3. For example, the audio module 520 can modify the guidance level 310 of the audio guidance 316.

The audio module 520 can modify the guidance level 310 of the audio guidance 316 in a number of ways. For example, the audio module 520 can increase the guidance level 310 of the audio guidance 316 based on the unfamiliar mode 308 if the current location 222 is within the unfamiliar area 208 to provide more information regarding the geographic region 202. In contrast, the audio module 520 can decrease the guidance level 310 of the audio guidance 316 based on the familiar mode 306 if the current location 222 is within the familiar area 206 to eliminate unnecessary information for the user who can be a local for the geographic region 202.

The audio module 520 can change the guidance level 310 of the audio guidance 316 based on the context 332 within the activity area 204. For example, the context 332 can represent traffic congestion commuting to the familiar area 206 of workplace. As discussed above, the mode type 302 can change from the unfamiliar mode 308 to the familiar mode 306 based on the context 332. Based on the change of the mode type 302, the audio module 520 can reduce the guidance level 310 of the audio guidance 316 to minimize distraction under the context 332. In contrast, the audio module 520 can increase the guidance level 310 if the context 332 changes to light traffic in the familiar area 206.

For another example, the current location 222 can be located within the unfamiliar area 208. More specifically, the user of the navigation system 100 can be traveling for vacation. The mode type 302 can represent the unfamiliar mode 308 for the audio module 520 to provide the audio guidance 316 representing the navigation guidance 312 related to the landmark. Furthermore, since the user is on vacation, the user may be sensitive in regards to the time he spends on the specific location during location. Depending on the context 332 of whether he is rushing to the next place or enjoying the location, the mode type 302 can change under the context 332 from the unfamiliar mode 308 to the familiar mode 306 for the audio module 520 to update the guidance level 310.

It has been discovered that the navigation system 100 can provide the audio guidance 316 based on the familiar area 206 or the unfamiliar area 208 can improve the safety of the user operating the vehicle, the navigation system 100, or a combination thereof. Modification of the guidance level 310 for the audio guidance 316 according to the activity area 204 and the context 332 maximizes the efficiency of providing the navigation guidance 312 optimal to the user. As a result, the user can safely operate the vehicle, the navigation system 100, or a combination thereof with minimal distraction.

The guidance module 518 can include a route module 522. The route module 522 generates the guidance type 314 of the route guidance 318 of FIG. 3. For example, the route module 522 can modify the route guidance 318.

The route module 522 can modify the route guidance 318 in a number of ways. For example, the route module 522 can modify the route guidance 318 based on the mode type 302, the activity area 204, the context 332, or a combination thereof. The activity area 204 can represent the familiar area 206 surrounding the familiar location 210 representing user's home. The route module 522 can decrease the guidance level 310 of the route guidance 318 by generating the travel route 226 of FIG. 2 having the local road and expressways but excluding freeways. In contrast, the route module 522 can increase the guidance level 310 of the route guidance 318 by generating the travel route 226 having all route types if the current location 222 is within the unfamiliar area 208.

For further example, the route module 522 can modify the guidance level 310 of the route guidance 318 representing a turn-by-turn direction based on the mode type 302, the activity area 204, or a combination thereof. If the current location 222 is within the familiar area 206, the route module 522 can reduce the route guidance 318 of turn-by-turn direction to a situation where the context 332 indicates traffic incident had occurred and eliminate the route guidance 318 for each turn suggested for the travel route 226. In contrast, if the current location 222 is within the unfamiliar area 208, the route module 522 can increase the route guidance 318 to include not only the turn-by-turn direction for each turn on the travel route 226 but also include suggestion for the category of interest 324 of FIG. 3 interested by the user of the navigation system 100.

It has been discovered that the navigation system 100 can provide the route guidance 318 based on the familiar area 206 or the unfamiliar area 208 can improve the safety of the user operating the vehicle, the navigation system 100, or a combination thereof. Modification of the guidance level 310 for the route guidance 318 according to the activity area 204 and the context 332 maximizes the efficiency of providing the navigation guidance 312 optimal to the user. As a result, the user can safely operate the vehicle, the navigation system 100, or a combination thereof with minimal distraction.

The guidance module 518 can include a search module 524. The search module 524 generates the search result 320 of FIG. 3. For example, the search module 524 can modify the search result 320 based on the mode type 302, the activity area 204, the activity record 228, the user preference 330, or a combination thereof.

The search module 524 can modify the search result 320 in a number of ways. For example, the mode type 302 can represent the familiar mode 306. The current location 222 can be within the familiar area 206 surrounding the familiar location 210 of user's home. The user preference 330 can represent the user of the navigation system 100 preferring local brands if the current location 222 is near user's home. The search module 524 can generate the search result 320 including the category of interest 324 for the local brands and excluding the category of interest 324 for non-local brands.

For another example, the search module 524 can modify the search result 320 based on the mode type 302, the context 332, the activity area 204, or a combination thereof. For example, the mode type 302 can represent the familiar mode 306. The current location 222 can be within the familiar area 206 surrounding the familiar location 210 representing the user's workplace. The context 332 can represent lunchtime. The search module 524 can generate the search result 320 including the category of interest 324 related to eateries near the workplace based on the context 332.

For another example, the search module 524 can generate the search result 320 based on the current location 222 within the unfamiliar area 208. More specifically, the context 332 can represent the user of the navigation system 100 traveling within the geographic region 202 away from the familiar location 210. As a result, the search module 524 can generate the search result 320 including the category of interest 324 for famous brand rather than the local brand of the geographic region 202. Additionally, the mode type 302 can represent the unfamiliar mode 308. The search result 320 generated under the unfamiliar mode 308 can rank the category of interest 324 for tour places and local interest higher than if the search result 320 was generated under the familiar mode 306.

It has been discovered that the navigation system 100 can provide the search result 320 based on the familiar area 206 or the unfamiliar area 208 can improve the safety of the user operating the vehicle, the navigation system 100, or a combination thereof. Modification of the search result 320 according to the activity area 204 and the context 332 maximizes the efficiency of providing the search result 320 having the category of interest 324 optimal for the user. As a result, the user can safely operate the vehicle, the navigation system 100, or a combination thereof with relevant information.

The guidance module 518 can include a map module 526. The map module 526 generates the travel map 322 of FIG. 3. For example, the map module 526 can generate the travel map 322 based on the mode type 302, the activity area 204, the context 332, or a combination thereof.

The map module 526 can generate the travel map 322 in a number of ways. For example, if the current location 222 is within the familiar area 206, the mode type 302 can represent the familiar mode 306. As a result, the map module 526 can generate the travel map 322 with less details to reduce clutter on the travel map 322. In contrast, if the current location 222 is within the unfamiliar area 208, the mode type 302 can represent the unfamiliar mode 308. The map module 526 can generate the travel map 322 having more of the point of locations for the category of interest 324 disclosed in the user preference 330 to provide more information to the user of first device 102 when he or she is in the unfamiliar area 208.

It has been discovered that the navigation system 100 can provide the travel map 322 based on the familiar area 206 or the unfamiliar area 208 can improve the safety of the user operating the vehicle, the navigation system 100, or a combination thereof. Modification of the travel map 322 according to the activity area 204 and the context 332 maximizes the efficiency of providing the travel map 322 optimal to the user. As a result, the user can safely operate the vehicle, the navigation system 100, or a combination thereof with minimal distraction.

The physical transformation from traveling from the familiar area 206 to the unfamiliar area 208 results in the movement in the physical work, such as people using the first device 102, the vehicle, or a combination thereof, based on the operation of the navigation system 100. As the movement in the physical world occurs, the movement itself creates additional information that is converted back into the mode type 302 and the navigation guidance 312 for the continued operation of the navigation system 100 and to continue the movement in the physical world.

The first software 426 of FIG. 4 of the first device 102 of FIG. 4 can include the modules for the navigation system 100. For example, the first software 426 can include the location module 502, the area module 508, the context module 514, mode module 516, and the guidance module 518.

The first control unit 412 of FIG. 4 can execute the first software 426 for the location module 502 to determine the current location 222. The first control unit 412 can execute the first software 426 for the area module 508 to generate the activity area 204. The first control unit 412 can execute the first software 426 for the context module 514 to determine the context 332. The first control unit 412 can execute the first software 426 for the mode module 516 to determine the guidance mode 304. The first control unit 412 can execute the first software 426 for the guidance module 518 to generate the navigation guidance 312.

The second software 442 of FIG. 4 of the second device 106 of FIG. 4 can include the modules for the navigation system 100. For example, the second software 442 can include the location module 502, the area module 508, the context module 514, mode module 516, and the guidance module 518.

The second control unit 434 of FIG. 4 can execute the second software 442 for the location module 502 to determine the current location 222. The second control unit 434 can execute the second software 442 for the area module 508 to generate the activity area 204. The second control unit 434 can execute the second software 442 for the context module 514 to determine the context 332. The second control unit 434 can execute the second software 442 for the mode module 516 to determine the guidance mode 304. The second control unit 434 can execute the second software 442 for the guidance module 518 to generate the navigation guidance 312.

The modules of the navigation system 100 can be partitioned between the first software 426 and the second software 442. The second software 442 can include the area module 508, the context module 514, mode module 516, and the guidance module 518. The second control unit 434 can execute modules partitioned on the second software 442 as previously described.

The first software 426 can include the location module 502. Based on the size of the first storage unit 414 of FIG. 4, the first software 426 can include additional modules of the navigation system 100. The first control unit 412 can execute the modules partitioned on the first software 426 as previously described.

The first control unit 412 can operate the first communication unit 416 of FIG. 4 to send the current location 222 to the second device 106. The first control unit 412 can operate the first software 426 to operate the location unit 420 of FIG. 4. The second communication unit 436 of FIG. 4 can send the navigation guidance 312 to the first device 102 through the communication path 104 of FIG. 4.

The navigation system 100 describes the module functions or order as an example. The modules can be partitioned differently. For example, the location module 502 and the context module 514 can be combined. Each of the modules can operate individually and independently of the other modules.

Furthermore, data generated in one module can be used by another module without being directly coupled to each other. For example, the guidance module 518 can receive the activity area 204 from the area module 508.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively.

Figure 6:
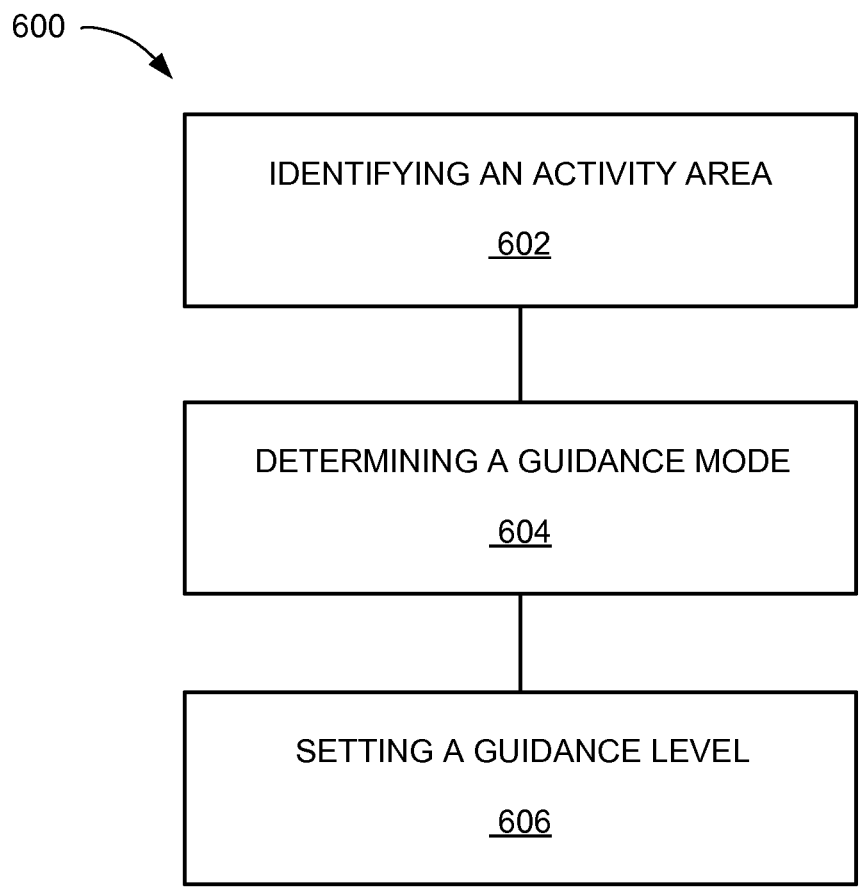
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: identifying an activity area with a control unit based on a user's travel meeting or exceeding a travel threshold in a block 602; determining a guidance mode based on a current location within the activity area and the current location for locating a device in a bloc 604; and setting a guidance level based on the guidance mode for presenting a navigation guidance on the device in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    identifying an activity area with a control unit based on a user's travel meeting or exceeding a travel threshold;
    determining a guidance mode based on a current location within the activity area and the current location for locating a device;
    setting a guidance level based on the guidance mode for presenting a navigation guidance on the device; and
    generating a travel map for the current location within a familiar area, the travel map different from the travel map when the current location is within an unfamiliar area.

2. The method as claimed in claim 1 wherein setting the guidance level includes increasing the guidance level based on the guidance mode of an unfamiliar mode for traveling through the unfamiliar area.

3. The method as claimed in claim 1 wherein setting the guidance level includes decreasing the guidance level based on the guidance mode of a familiar mode for traveling through the familiar area.

4. The method as claimed in claim 1 wherein identifying the activity area includes identifying the familiar area based on a threshold distance from a familiar location.

5. The method as claimed in claim 1 further comprising determining a familiar location based on a number of the user's travel meeting or exceeding the travel threshold.

6. A method of operation of a navigation system comprising:
    determining a context of a user's travel;
    identifying an activity area with a control unit based on the context and the user's travel meeting or exceeding a travel threshold;
    determining a guidance mode based on a current location within the activity area and the current location for locating a device;
    setting a guidance level based on the guidance mode for presenting a navigation guidance on the device; and
    generating a travel map for the current location within a familiar area, the travel map different from the travel map when the current location is within an unfamiliar area.

7. The method as claimed in claim 6 further comprising generating an audio guidance for the current location within the familiar area, the audio guidance having the guidance level different from the audio guidance when the current location is within the unfamiliar area.

8. The method as claimed in claim 6 further comprising generating a route guidance for the current location within the familiar area, the route guidance having the guidance level different from the route guidance when the current location is within the unfamiliar area.

9. The method as claimed in claim 6 further comprising generating a search result for the current location within a familiar area, the search result different from the search result when the current location is within the unfamiliar area.

10. A navigation system comprising:
    a control unit for:
        identifying an activity area based on a user's travel meeting or exceeding a travel threshold,
        determining a guidance mode based on a current location within the activity area and the current location for locating a device, setting a guidance level based on the guidance mode for presenting a navigation guidance on the device, generating a travel map for the current location within a familiar area, the travel map different from the travel map when the current location is within an unfamiliar area, and a communication interface, coupled to the control unit for communicating the travel map for presenting on the device.

11. The system as claimed in claim 10 wherein the control unit is for increasing the guidance level based on the guidance mode of an unfamiliar mode for traveling through the unfamiliar area.

12. The system as claimed in claim 10 wherein the control unit is for decreasing the guidance level based on the guidance mode of a familiar mode for traveling through the familiar area.

13. The system as claimed in claim 10 wherein the control unit is for identifying the familiar area based on a threshold distance from a familiar location.

14. The system as claimed in claim 10 wherein the control unit is for determining a familiar location based on a number of the user's travel meeting or exceeding the travel threshold.

15. The system as claimed in claim 10 wherein the control unit is for:

determining a context of a user's travel; and identifying an activity area based on the context and the user's travel meeting or exceeding a travel threshold.

16. The system as claimed in claim 15 wherein the control unit is for generating an audio guidance for the current location within the familiar area, the audio guidance having the guidance level different from the audio guidance when the current location is within the unfamiliar area.

17. The system as claimed in claim 15 wherein the control unit is for generating a route guidance for the current location within the familiar area, the route guidance having the guidance level different from the route guidance when the current location is within the unfamiliar area.

18. The system as claimed in claim 15 wherein the control unit is for generating a search result for the current location within the familiar area, the search result different from the search result when the current location is within the unfamiliar area.

* * * * *